US009299210B2

(12) United States Patent
Parrish et al.

(10) Patent No.: US 9,299,210 B2
(45) Date of Patent: Mar. 29, 2016

(54) SYSTEM AND METHOD FOR DISPENSING PRESCRIPTIONS

(75) Inventors: David J. Parrish, Youngsville, NC (US); Thomas P. Rhoads, Jr., Raleigh, NC (US); David Alan Calderwood, Chapel Hill, NC (US); Jesse Samuel Eberdt, III, Durham, NC (US)

(73) Assignee: Parata Systems, LLC, Durham, NC (US)

( * ) Notice: Subject to any disclaimer, the term of this patent is extended or adjusted under 35 U.S.C. 154(b) by 1142 days.

(21) Appl. No.: 12/187,666

(22) Filed: Aug. 7, 2008

(65) Prior Publication Data

US 2009/0043421 A1 Feb. 12, 2009

Related U.S. Application Data

(60) Provisional application No. 60/955,084, filed on Aug. 10, 2007, provisional application No. 61/018,978, filed on Jan. 4, 2008.

(51) Int. Cl.

| | |
|---|---|
| ***G06F 17/00*** | (2006.01) |
| ***G07F 11/62*** | (2006.01) |
| ***G07F 9/02*** | (2006.01) |
| ***G07F 11/10*** | (2006.01) |
| ***G07F 11/44*** | (2006.01) |
| ***G07F 17/00*** | (2006.01) |

(52) U.S. Cl.
CPC ................ *G07F 11/62* (2013.01); *G07F 9/026* (2013.01); *G07F 11/10* (2013.01); *G07F 11/44* (2013.01); *G07F 17/0092* (2013.01)

(58) Field of Classification Search
CPC ................................ G07F 11/10; G07F 11/44
USPC .................................................. 700/241, 242
See application file for complete search history.

(56) References Cited

U.S. PATENT DOCUMENTS

| | | | | | |
|---|---|---|---|---|---|
| 4,018,358 | A | | 4/1977 | Johnson et al. | |
| 4,664,289 | A | * | 5/1987 | Shimizu et al. | 221/2 |
| 5,295,743 | A | | 3/1994 | Moulton et al. | |
| 5,348,061 | A | * | 9/1994 | Riley et al. | 141/104 |
| 5,597,995 | A | * | 1/1997 | Williams et al. | 235/375 |
| 5,671,262 | A | * | 9/1997 | Boyer et al. | 377/11 |
| 5,720,154 | A | * | 2/1998 | Lasher et al. | 53/411 |
| 5,736,942 | A | | 4/1998 | Randolph | |
| 5,905,653 | A | | 5/1999 | Higham et al. | |
| 5,907,493 | A | * | 5/1999 | Boyer et al. | 700/231 |
| 6,426,699 | B1 | | 7/2002 | Porter | |
| 6,892,941 | B2 | | 5/2005 | Rosenblum | |
| 7,006,893 | B2 | | 2/2006 | Hart et al. | |
| 7,080,755 | B2 | | 7/2006 | Handfield et al. | |
| 7,123,989 | B2 | | 10/2006 | Pinney et al. | |
| 7,170,823 | B2 | | 1/2007 | Fabricius et al. | |

(Continued)

*Primary Examiner* — Michael K Collins
(74) *Attorney, Agent, or Firm* — Myers Bigel & Sibley, P.A.

(57) ABSTRACT

A pharmaceutical dispensing system includes: a frame having first and second opposed sides; a plurality of bins configured to house pharmaceutical tablets, each of the bins being accessible from the first side of the frame for replenishment of pharmaceutical tablets; and a plurality of chutes, each of the chutes connected to and associated with a respective one of the plurality of bins, each of the chutes being accessible from the second side of the frame for dispensing of pharmaceutical tablets. A system of this configuration can facilitate operation by physically separating replenishment tasks from dispensing tasks, thereby enabling these tasks to be performed simultaneously.

7 Claims, 7 Drawing Sheets

(56) References Cited

U.S. PATENT DOCUMENTS

| | | | | |
|---|---|---|---|---|
| RE40,453 | E * | 8/2008 | Lasher et al. | 53/411 |
| 7,630,788 | B1 | 12/2009 | Reese | |
| 7,693,603 | B2 | 4/2010 | Higham | |
| 7,805,217 | B2 * | 9/2010 | Chudy et al. | 700/237 |
| 7,840,307 | B2 * | 11/2010 | Mauger et al. | 700/237 |
| 2003/0216831 | A1 | 11/2003 | Hart et al. | |
| 2004/0133705 | A1 * | 7/2004 | Broussard et al. | 710/1 |
| 2005/0183128 | A1 | 8/2005 | Assayag et al. | |
| 2006/0265102 | A1 * | 11/2006 | Bain | 700/237 |
| 2010/0042437 | A1 | 2/2010 | Levy et al. | |

* cited by examiner

SYSTEM AND METHOD FOR DISPENSING PRESCRIPTIONS

This application claims priority from U.S. Provisional Patent Application No. 60/955,084, filed Aug. 10, 2007 for System and Method for Dispensing Prescriptions, and from U.S. Provisional Patent Application No. 61/018,978, filed Jan. 4, 2008, for System and Method for Dispensing Prescriptions, the disclosure of each of which is hereby incorporated herein in its entirety.

FIELD OF THE INVENTION

The present invention is directed generally to the dispensing of prescriptions of pharmaceuticals, and more specifically is directed to the automated dispensing of pharmaceuticals.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate all or portions of the pharmacy environment. Different exemplary approaches are shown in U.S. Pat. Nos. 6,006,946; 6,036,812 and 6,176,392 to Williams et al. and in U.S. Pat. No. 7,014,063 to Shows et al. The Williams system conveys a bin with tablets to a counter and a vial to the counter. The counter dispenses tablets to the vial. Once the tablets have been dispensed, the system returns the bin to its original location and conveys the vial to an output device. Tablets may be counted and dispensed with any number of counting devices. Shows et al. discloses a system that includes multiple drawers, each of which includes a plurality of dispensing devices that dispense tablets into a dispensing chute. The dispensing devices may be of the so-called "Baker Cell" configuration (see U.S. Pat. No. 3,368,713 to Hurst et al.), in which the tablets are mechanically singulated and counted prior to dispensing into the dispensing chute. The tablets are stored in the dispensing chute until such time as a pharmacist or technician dispenses the tablets from the chute into a pharmaceutical vial.

Although this particular system can provide automated pharmaceutical dispensing, certain of the operations may be improved or varied. For example, in order to save on pharmacy space, some pharmacies may prefer automated singulation and counting of the pills, but with manual labeling, dispensing of the pills into the vial, and capping. Additionally, a system that separates the functions of prescription dispensing and system replenishment can allow for improved efficiency in pharmacy operations by allowing these functions to be performed simultaneously. Thus, there may be a need for a system that can address these types of operations, particularly one that can do so in an efficient manner.

SUMMARY OF THE INVENTION

As a first aspect, embodiments of the present invention are directed to a pharmaceutical dispensing system, comprising: a frame having first and second opposed sides; a plurality of bins configured to house pharmaceutical tablets, each of the bins being accessible from the first side of the frame for replenishment of pharmaceutical tablets; and a plurality of chutes, each of the chutes connected to and associated with a respective one of the plurality of bins, each of the chutes being accessible from the second side of the frame for dispensing of pharmaceutical tablets. A system of this configuration can facilitate operation by physically separating replenishment tasks from dispensing tasks, thereby enabling these tasks to be performed simultaneously.

DETAILED DESCRIPTION OF EMBODIMENTS OF THE INVENTION

Figure 1:
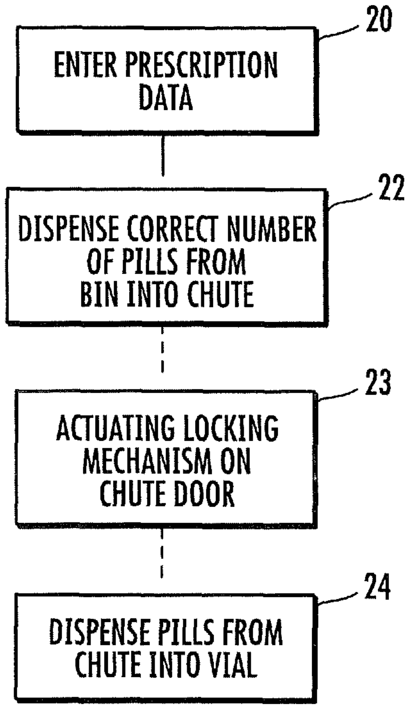
FIG. 1 is a flowchart illustrating overall operations of a pharmaceutical dispensing system according to embodiments of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As described above, the invention relates generally to a system and process for dispensing pharmaceuticals. An exemplary process is described generally with reference to FIG. 1. The process begins with the entry of prescription data (Box 20). The correct number of pills to fill the prescription is dispensed from a bin containing a bulk supply of those pills into an attached chute (Box 22). The pills are then dispensed from the chute into a vial (Box 24), wherein the vial is typically held by pharmacy personnel. Optionally, the process may include a step in which a door of the chute is unlocked, typically in response to the system providing authorization to a user to release the pills from the chute (Box 23). As used herein, the terms "pills," "tablets", "capsules", "gel caps", "lozenges" and other terms for oral solid medicaments are used interchangeably and are not intended to be limiting.

Figure 3:
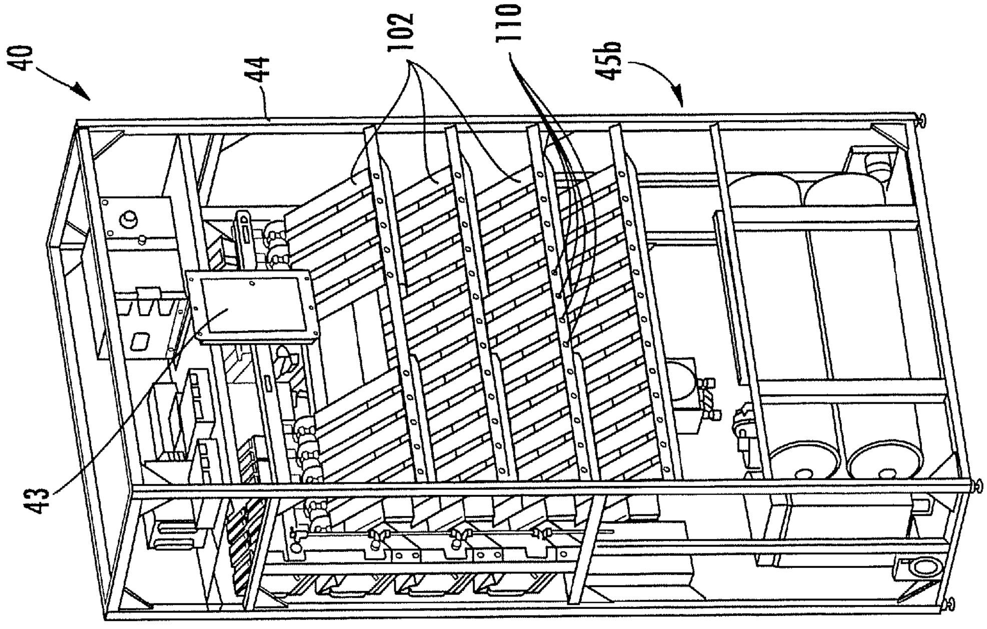
FIG. 3 is a reverse perspective view of the dispensing side (illustrating the chutes) of the pharmaceutical dispensing system of FIG. 2.
Figure 2:
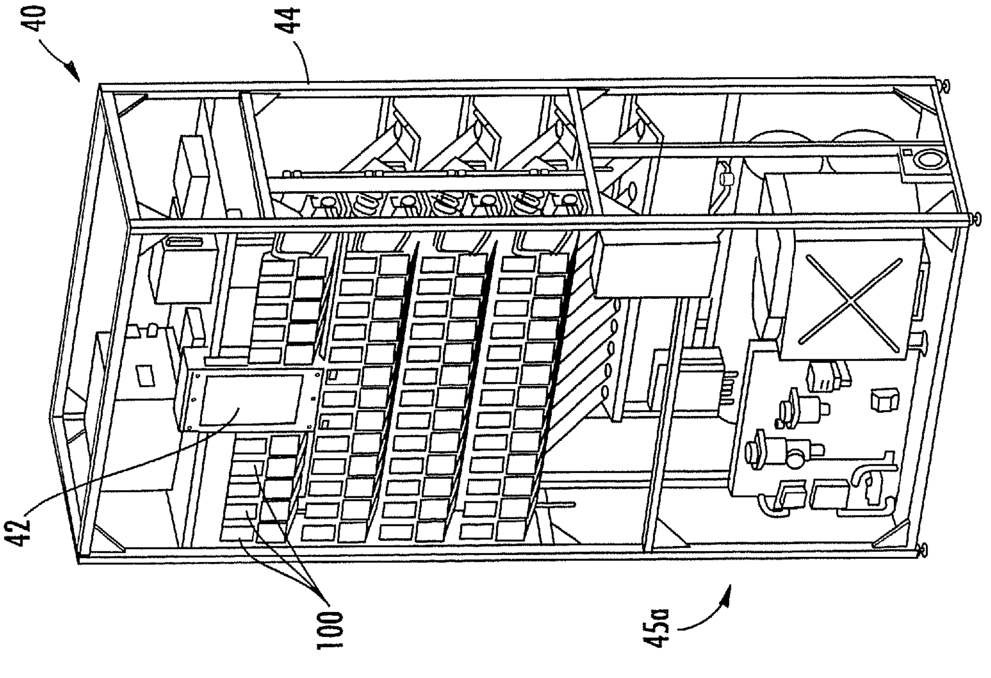
FIG. 2 is a perspective view of the replenishing side (illustrating the bins) of a pharmaceutical dispensing system according to embodiments of the present invention.

A system that can carry out this process is illustrated in FIGS. 2 and 3 and designated broadly therein at 40. The system 40 includes a support frame 44 for the mounting of its various components. The system 40 generally includes as operative stations a controller (represented herein by two graphics user interface monitors (GUIs) 42, 43), a number of tablet dispensing bins 100, and a number of chute assemblies 102, each associated with a respective bin 100. As can be seen in FIGS. 2 and 3, the bins 100 are mounted on one side 45*a* of the frame 44, and the chute assemblies 102 are mounted on the opposite side 45*b* of the frame 44.

In the illustrated embodiment, the bins 100 are configured to singulate, count and dispense pills through an air agitation technique. The air agitation technique is described in some detail in, for example, U.S. Pat. No. 6,971,541 to Williams et al., supra. and U.S. Pat. No. 7,344,049, and need not be described in detail herein. Those skilled in this art will appreciate that other pill dispensing apparatus, including those that rely on mechanical singulating action (see, e.g., U.S. Pat. No. 7,014,063), may also be employed.

Figure 4:
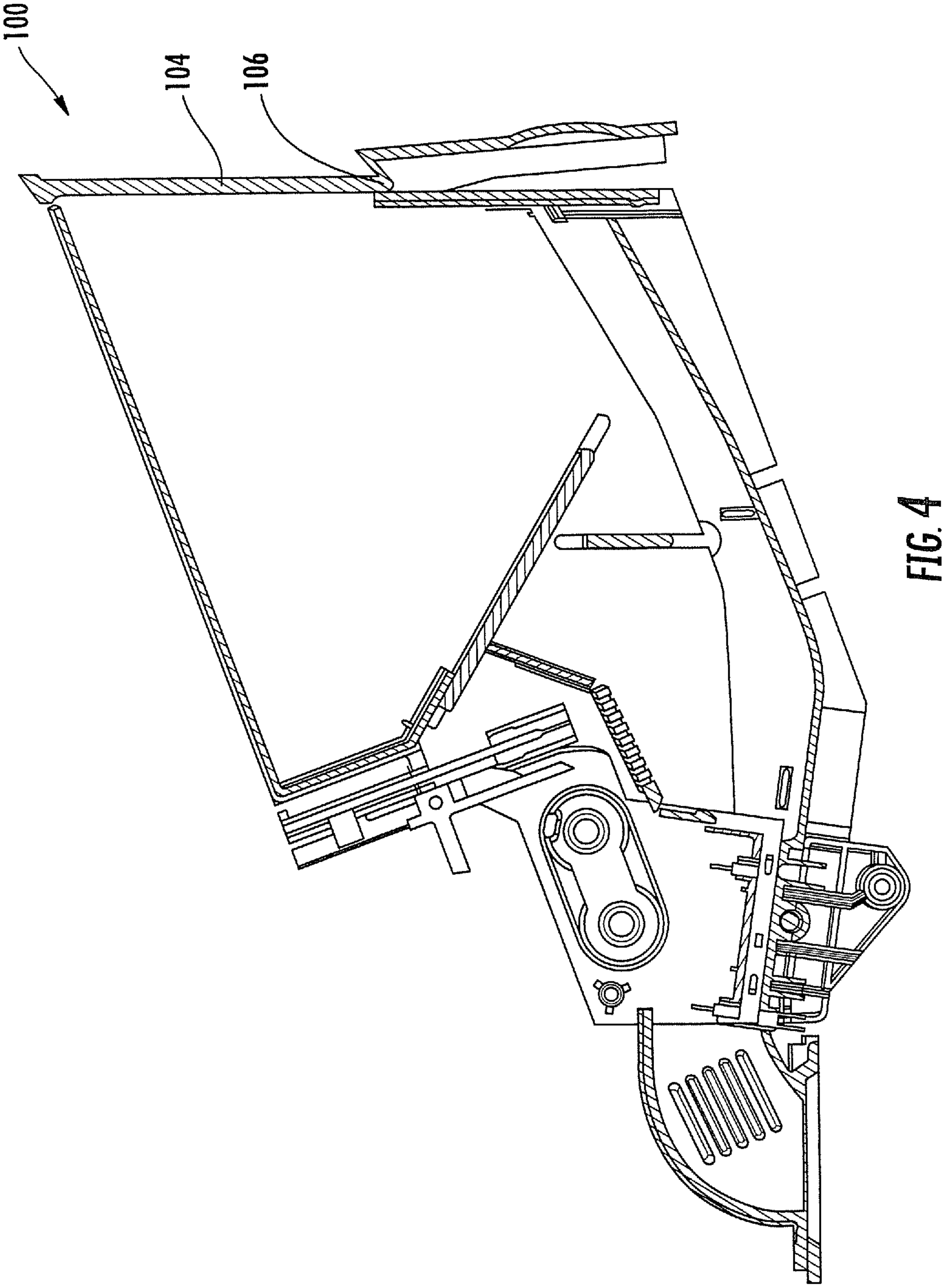
FIG. 4 is a section view of an exemplary bin of the system of FIG. 2.

Referring now to FIG. 4, the bins 100 are oriented so that each can be replenished by an operator facing the side 45*a* of the frame 44. Each bin 100 includes a door 104 that is pivotally attached to the bin 100 at a hinge 106. During dispensing of tablets from the bin 100, the door 104 is in a closed position. If the bin 100 requires replenishment, the door 104 can be moved to an open position that enables a technician to refill the bin 100 with the correct pills.

In some embodiments, each of the bins 100 may have a locking system (such as that illustrated and described in U.S. patent application Ser. No. 11/760,016, filed Jun. 8, 2007, the disclosure of which is hereby incorporated herein in its entirety) that prevents the door 104 from being opened without the scanning of the technician's ID badge or the receipt of replenishment authorization in another form. Each bin 100 may also have a bar code or other identifier (not shown) that indicates the contents of the bin. Each of the bins 100 may also have a light or other indicator (not shown) that indicates a particular bin 100 that is to be replenished in order to direct the technician to the proper bin 100.

The replenishment process is controlled by the GUI 42 (FIG. 2). The GUI 42, which is located on side 45*a* of the frame 44, can control all operations pertaining to replenishment, including the need for replenishment, the locking/unlocking of bins 100, the indication of the proper bin 100, confirmation that the correct pills are being added to the bin, rejection of incorrect pills, and the like. The GUI 42 can also serve to control the dispensing of pills from the bins 100 into the chute assemblies 102. Dispensing can be the result of manual entry by a technician via the GUI 42, or can be directed by an external computer, such as an overall pharmacy host computer.

Figure 5:
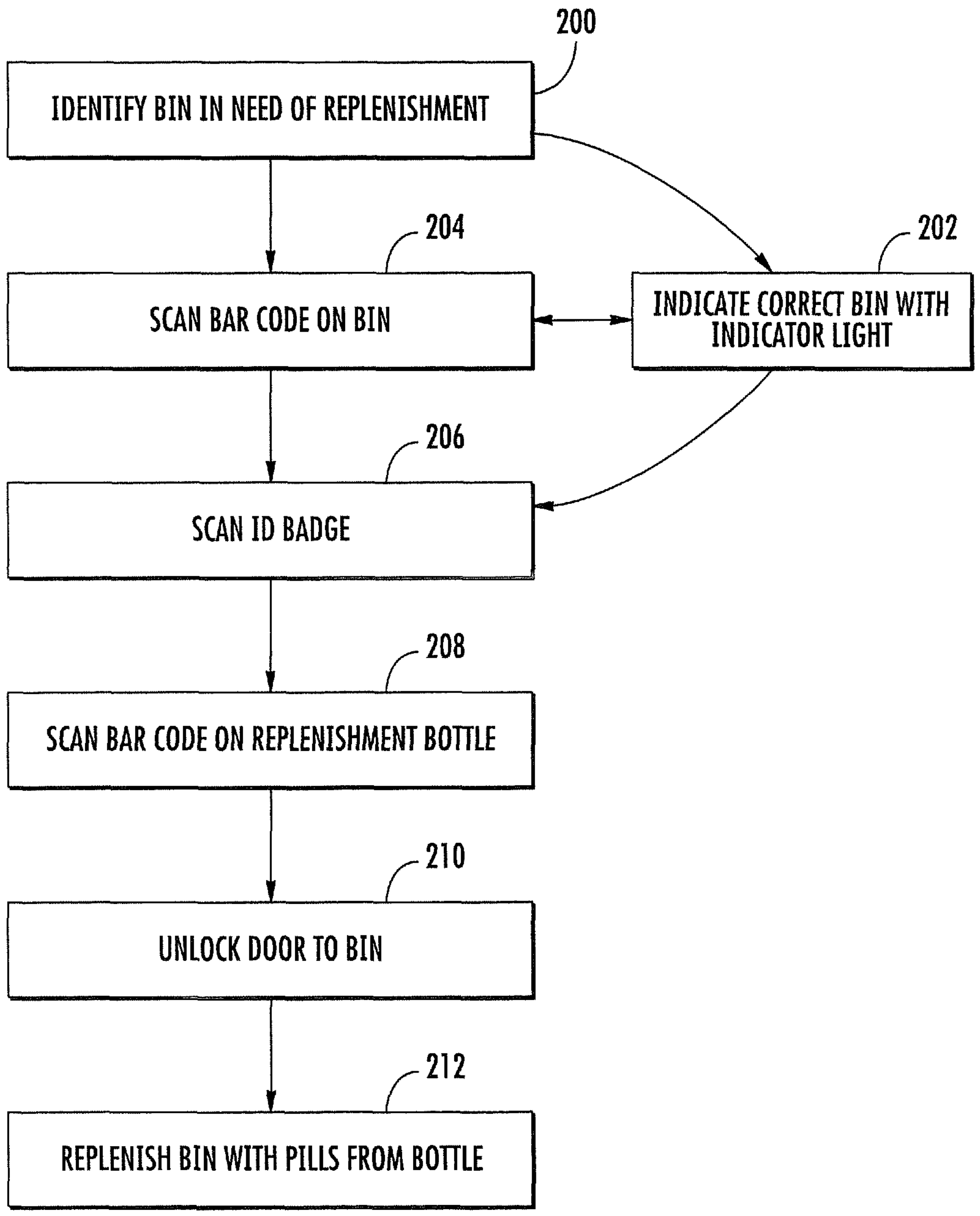
FIG. 5 is a flowchart illustrating the replenishing of bins of the system of FIG. 2.

The operations performed on the side 45*a* of the frame 44 are illustrated in FIG. 5. First, the bin 100 in need of replenishment is identified (box 200); this can be performed via manual inspection, inventory tracking by the pharmacy host computer, a sensor in the bin that monitors volume, or the like. In some embodiments, a light or other indicator may visually indicate which bin 100 is to be replenished (box 202); alternatively, the pharmacy technician may be able to read a chart or map displayed on the GUI 42 that indicates the proper bin 100 (in either embodiment, the technician may be required to scan a bar code, RFID tag or the like on the bin 100 to verify that it is the proper bin—box 204). It may also be necessary in some embodiments for the technician demonstrate his/her authority to replenish the bin 100 via the scanning of an ID badge, the use of an RFID tag, a biometric scan or the like (box 206), and/or for the technician to scan a bar code or RFID tag on the bulk supply bottle of pills (box 208) in order for the door 106 on the bin 100 to unlock (box 210). Once the door is able to be opened, the bin 100 can be replenished with pills (box 212). As such, all replenishing can be performed from the side 45*a* of the frame 44.

Figure 6:
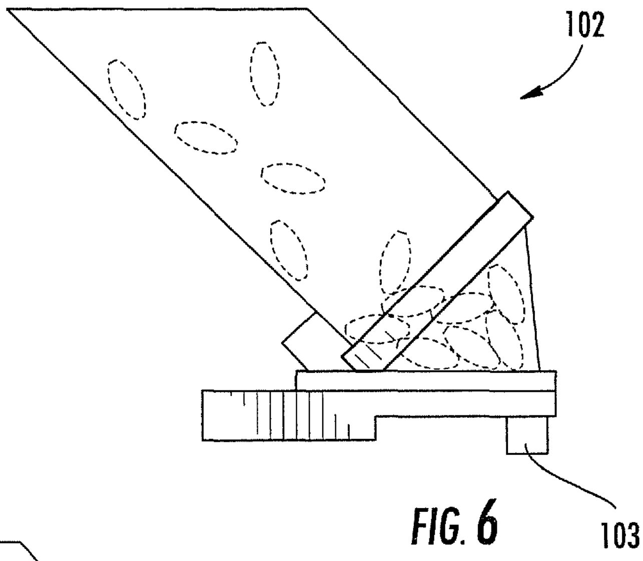
FIG. 6 is a side view of an exemplary chute of the system of FIG. 2 in which pills from a bin are being staged.
Figure 7:
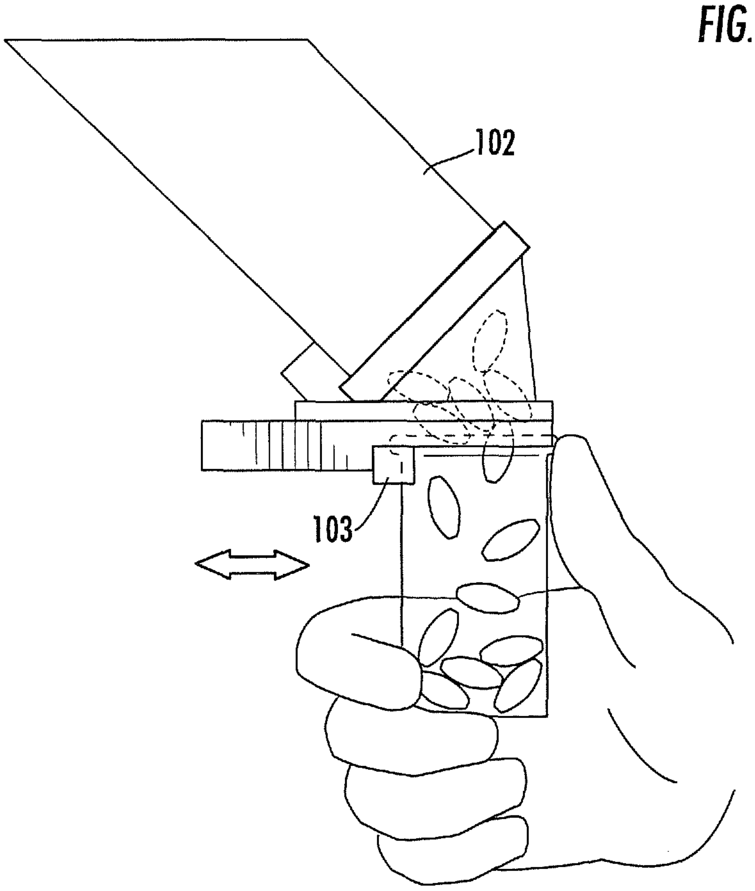
FIG. 7 is a side view of the chute of FIG. 6 illustrating staged pills being dispensed into a vial.

Referring now to FIGS. 6 and 7, the chute assemblies 102 extend from the bins 100 on the side 45*a* to the side 45*b*, where pills dispensed from a bin 100 into a chute assembly 102 can be dispensed from the chute assembly 102 into a vial. Each of the chute assemblies 102 includes a door 103, gate or other selective access device at its lower end to allow dispensed pills to be "staged" in the chute assembly 102 after dispensing from the bin 100; subsequently, a technician can open the door 103 to release the pills from the chute assembly 102 into a vial positioned beneath the door 103 (FIG. 7). Exemplary selective access devices are disclosed in, for example, U.S. Provisional Patent Application No. 60/955,056, filed Aug. 10, 2007; U.S. Provisional Patent Application No. 60/955,059, filed Aug. 10, 2007; U.S. patent application Ser. No. 12/185,981, filed Aug. 5, 2008; U.S. patent application Ser. No. 12/186,025, filed Aug. 5, 2008, and U.S. patent application Ser. No. 12/187,574, filed Aug. 7, 2008, entitled DEVICE FOR STAGING AND DISPENSING TABLETS USEFUL IN SYSTEM AND METHOD FOR DISPENSING PRESCRIPTIONS, the disclosures of each of which are hereby incorporated herein by reference.

In some embodiments, a bar code scanner or other identifying device may also be included on the side 45*b* of the frame 44. The bar code scanner can be configured to scan any or all of (a) a bar code on a vial to identify a specific prescription, (b) an ID badge or other identifier of a technician to verify that the technician has authorization to receive pills from a chute assembly 102, (c) a bar code on a chute assembly 102 to identify the type of pills that are dispensed into that chute assembly 102, or any other item of interest. In some embodiments, the bar code scanner may be replaced with an RFID tag detector and/or, in the case of identifying an authorized technician, a biometric scanner.

In some embodiments, the chute assemblies 102 may include a locking unit (not shown) that prevents the door from being opened without authorization (via a scan of an ID badge, and RFID tag, a biometric identifier, or the like) or without confirmation that it is the correct prescription (via a scan of the bar code on the vial, for example). An exemplary locking unit is shown in U.S. Provisional Patent Application No. 60/955,056, supra. Also, in some embodiments, the chute assemblies 102 may include a light (not shown) or other indicator (not shown) that indicates which chute assembly 102 contains a given prescription.

The process of dispensing pills from the chute assemblies 102 is controlled by the GUI 43. The GUI 43, which is located in the side 45*b* of the frame 44, can control all operations pertaining to dispensing, including the establishment of authorization to dispense pills into a vial, the locking/unlocking of the doors to chute assemblies 102, the indication of the proper chute assembly 102 for a particular prescription, and the like. The GUI 43 can also serve to control the dispensing of pills from the bins 100 into the chute assemblies 102, either automatically or manually. Dispensing can be the result of manual entry by a technician via the GUI 43, or can be directed by an external computer, such as an overall pharmacy host computer.

Figure 8:
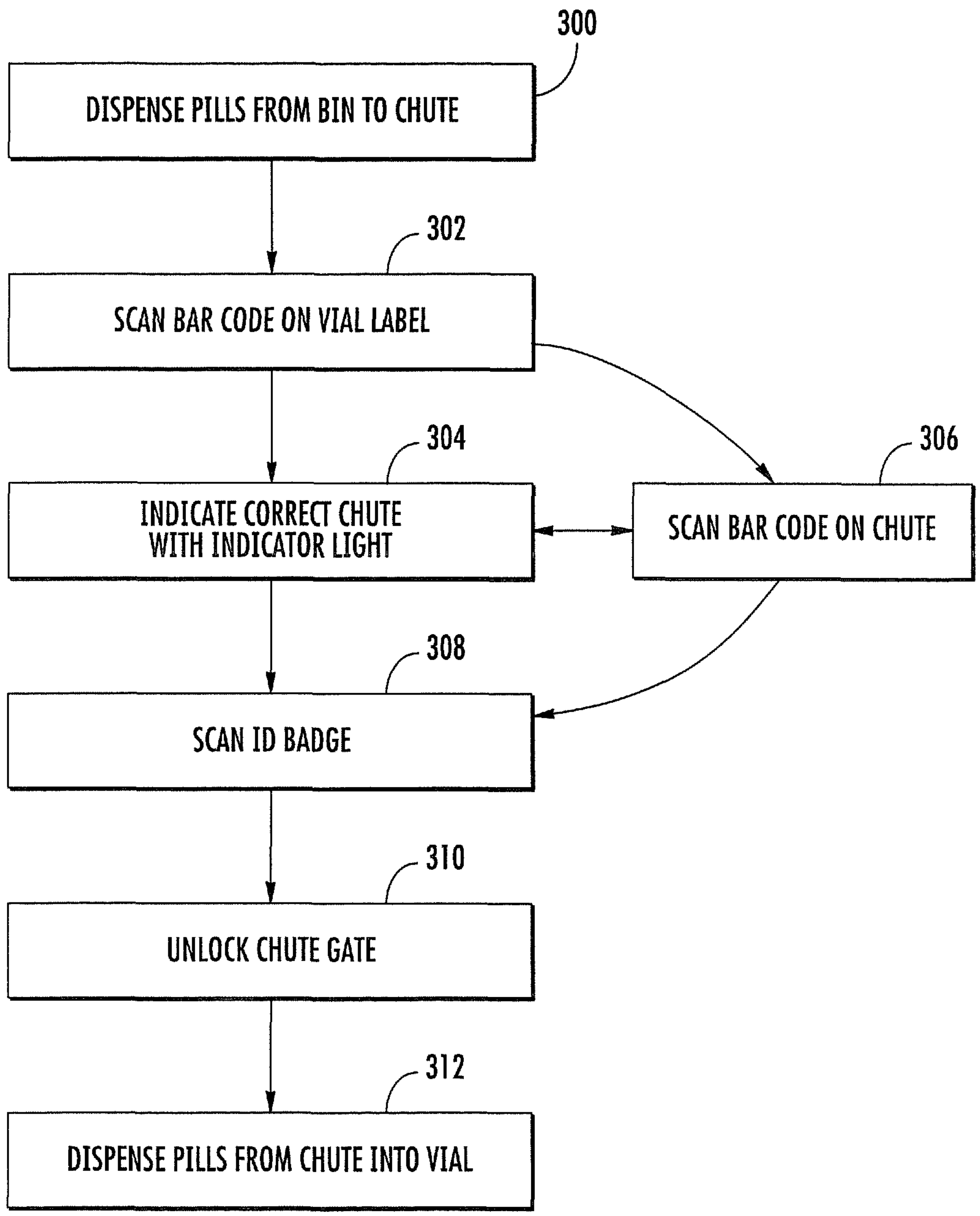
FIG. 8 is a flow chart illustrating the dispensing of pills from chutes of the system of FIG. 2.

The operations that are performed on side 45*b* of the frame 44 are illustrated in FIG. 8. First, pills are dispensed from a bin 100 to a chute assembly 102 (box 300). In some embodiments, a light or other indicator will identify a chute assembly 102 that is ready for the dispensing of a particular prescription (box 304); in other embodiments, the scanner may be employed to scan a bar code on or proximate to the chute assembly 102 (box 306). In certain embodiments, the technician may be required to scan his ID badge or an RFID tag or submit to a biometric scan (box 308), and/or the technician may be required to scan the vial label (box 302) in order for the gate on the chute assembly 102 to unlock (box 310). Once the gate can be opened, the pills can be dispensed into the vial (box 312). As such, all dispensing operations can be performed by a technician positioned on the side 45*b* of the frame 44.

Figure 9:
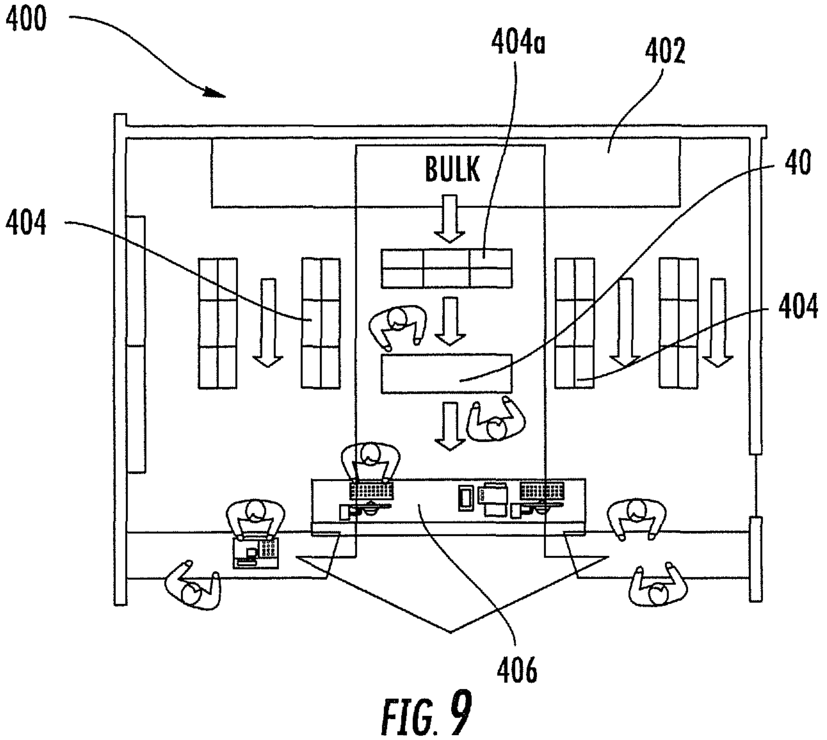
FIG. 9 is a schematic top view of a pharmacy configuration that employs the system of FIGS. 2 and 3.

In addition to facilitating workflow, the system 40 can facilitate inventory flow from a bulk station (such as a stock room) to a shelf stock area (with stock bottles), a vial fill area, and a verification/customer interaction station. This can be seen in FIG. 9, wherein a pharmacy 400 includes a bulk stock room 402, stock shelves 404, an automated system 40, and a verification/customer interaction station 406. This pharmacy 400 has the system 40 oriented parallel to the pharmacy counter and to a stock shelf 404*a* that includes particularly high volume drugs, so that the high volume drugs follow a short, rapid path from the bulk stock room 402 to the stock shelves 404*a*, the system 40 and the verification/customer interaction station 406. By positioning the system 40 as shown in FIG. 9, the pharmacy can realize high efficiency for the distribution of its high volume drugs. Alternatively, high volume drugs may be directly transferred from the bulk stock room 402 to the system 40.

Figure 10:
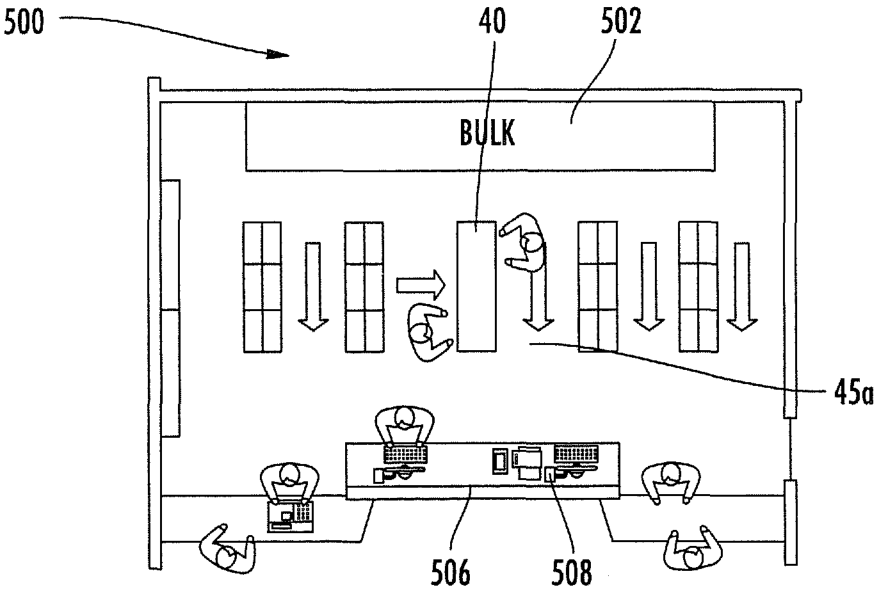
FIG. 10 is a schematic top view of an alternative pharmacy configuration that employs the system of FIGS. 2 and 3.

FIG. 10 illustrates an alternative pharmacy 500 in which the automated system 40 is oriented to be perpendicular to the bulk supply 502 and the verification/customer interaction station 506. In this configuration, the system 40 can be oriented such that the dispensing side 45*b* of the system 40 is nearest the verification portion 508 of the verification/customer interaction station 506.

It should also be noted that the system 40 can be provided as a stand-alone cabinet or as part of a group of similar cabinets. In the case of multiple cabinets, one system 400 would be the "master", and the other(s) would be the "slave (s)". In this arrangement, a "slave" may use the air system from the master as the source of air pressure for operations in order to conserve energy and cost.

Those skilled in this art will appreciate that, with respect to the operations illustrated in FIGS. 1, 5 and 8, the sequence of steps shown therein may be varied, and some of the steps may be omitted.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A pharmacy arrangement, comprising:

a bulk stock area;

an automated pharmaceutical dispensing machine comprising:

a frame having first and second opposed sides;

a plurality of bins configured to house pharmaceutical tablets, each of the bins being accessible from the first side of the frame for replenishment of pharmaceutical tablets, the first side of the frame facing the bulk stock area; and a plurality of outlets, each of the outlets connected to and associated with a respective one of the plurality of bins, each of the outlets being accessible from the second side of the frame for dispensing of pharmaceutical tablets; and a customer interaction area, the second side of the frame facing the customer interaction area;

wherein the bulk stock area, the dispensing machine and the customer interaction area are generally aligned along a material flow path that extends through the first and second sides of the dispensing machine.

2. The pharmacy arrangement defined in claim 1, wherein stock shelves are positioned generally parallel to and offset from the material flow path.

3. The pharmacy arrangement defined in claim 1, wherein the automated pharmaceutical machine includes a first graphics user interface mounted on the first side of the frame for controlling the replenishment of the plurality of bins.

4. The pharmacy arrangement defined in claim 3, wherein the automated pharmaceutical machine includes a second graphics user interface mounted on the second side of the frame for controlling the dispensing of pharmaceutical tablets from the chutes.

5. The pharmacy arrangement defined in claim 1, wherein the automated pharmaceutical machine includes a second graphics user interface mounted on the second side of the frame for controlling the dispensing of pharmaceutical tablets from the chutes.

6. The pharmacy arrangement defined in claim 5, wherein the outlets comprise chutes that extend from the bins to the second side of the frame.

7. A pharmacy arrangement, comprising:

a bulk stock area;

an automated pharmaceutical dispensing machine comprising:

a frame having first and second opposed sides;

a plurality of bins configured to house pharmaceutical tablets, each of the bins being accessible from the first side of the frame for replenishment of pharmaceutical tablets, the first side of the frame facing the bulk stock area; and a plurality of outlets, each of the outlets connected to and associated with a respective one of the plurality of bins, each of the outlets being accessible from the second side of the frame for dispensing of pharmaceutical tablets; and a customer interaction area, the second side of the frame facing the customer interaction area;

wherein the bulk stock area, the dispensing machine and the customer interaction area are generally aligned along a material flow path;

wherein the dispensing machine is generally parallel to the material flow path, and wherein the second side of the frame is adjacent a verification portion of the customer interaction area.

* * * * *